July 16, 1935. C. P. DAY 2,008,579
SCREEN
Original Filed Jan. 6, 1931 3 Sheets-Sheet 1

INVENTOR
Courtenay P. Day
BY
Mitchell Bechert
ATTORNEYS.

July 16, 1935.  C. P. DAY  2,008,579
SCREEN
Original Filed Jan. 6, 1931   3 Sheets-Sheet 2
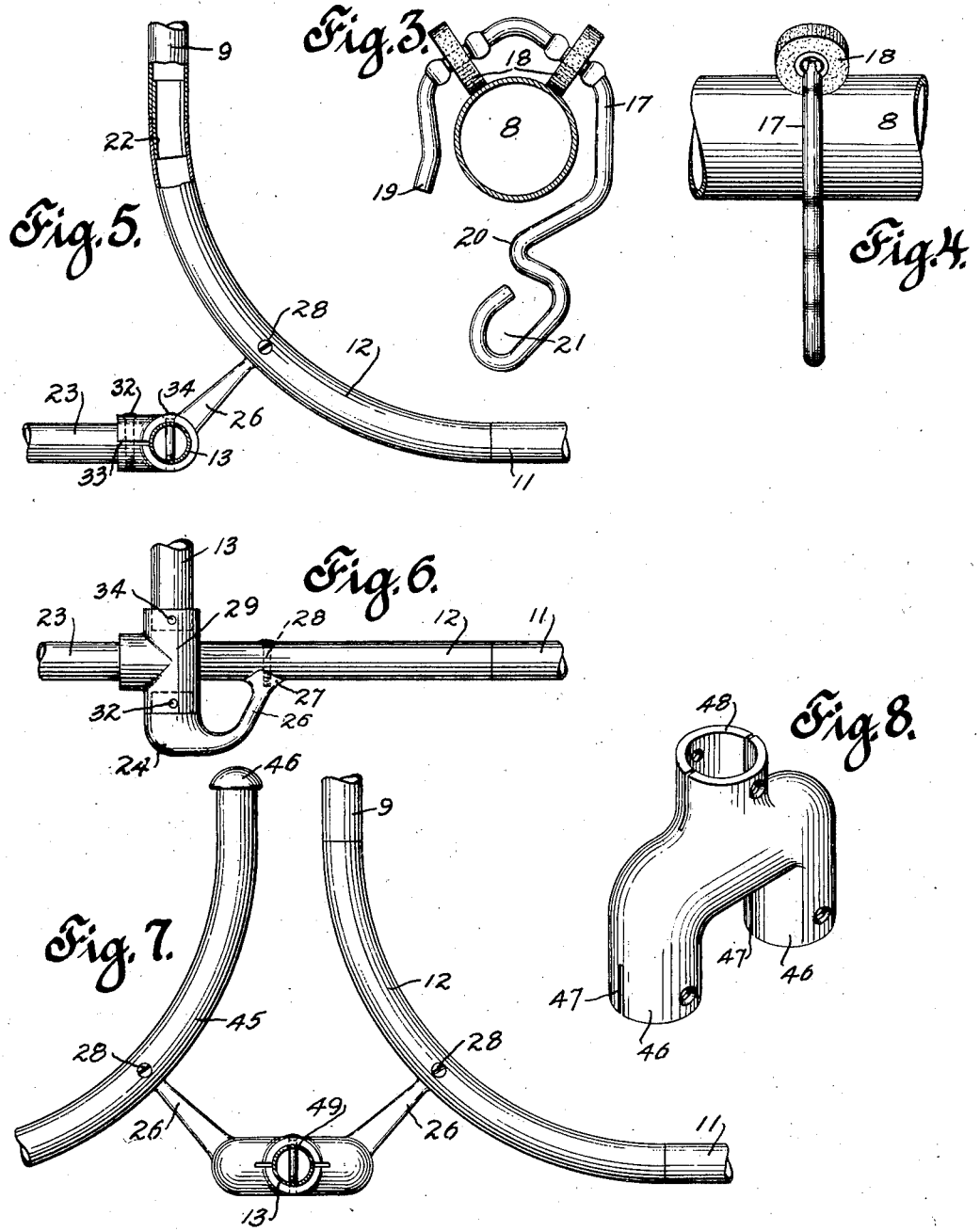

July 16, 1935. C. P. DAY 2,008,579
SCREEN
Original Filed Jan. 6, 1931   3 Sheets-Sheet 3
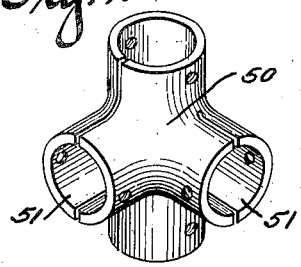
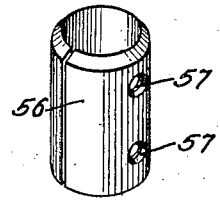
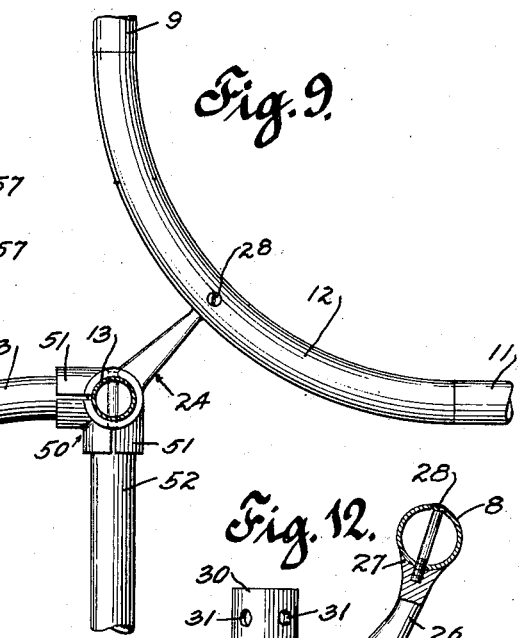
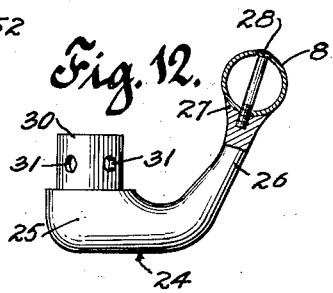
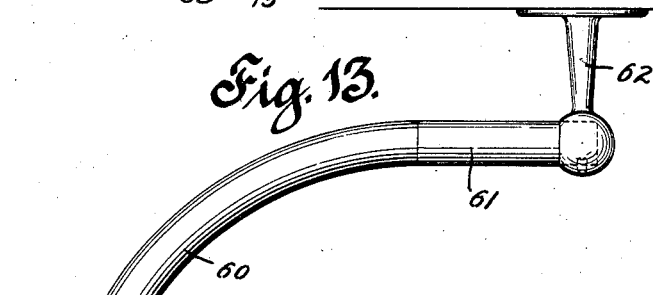
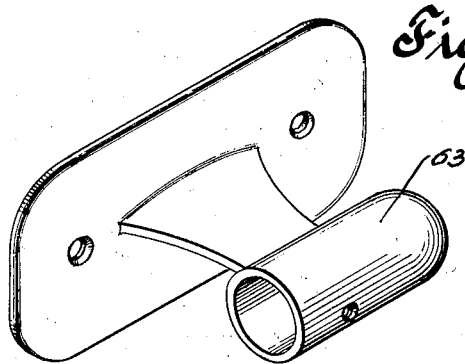
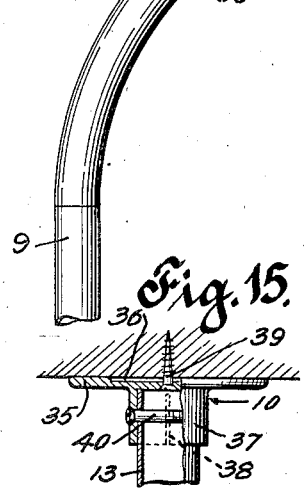
INVENTOR
Courtenay P. Day
BY
Mitchell Bechut
ATTORNEYS.

Patented July 16, 1935

2,008,579

UNITED STATES PATENT OFFICE 2,008,579

SCREEN

Courtenay P. Day, New York, N. Y., assignor to H. L. Judd Company, Inc., New York, N. Y., a corporation of Delaware Application January 6, 1931, Serial No. 506,870
Renewed January 20, 1933

18 Claims. (Cl. 156—22)

My invention relates to a screen system, particularly, though not exclusively, adapted for screening beds in hospitals. Heretofore in so called cubicle screening, in order to enclose a space such as that occupied by a bed, it has been usual to employ either floor screens, which are supported by stands from the floor, or suspended sliding curtains so arranged that three separate curtains are required. In such prior screen systems it has been impossible to secure complete screening, for the reason that the curtains do not properly overlap, and the slightest breeze would cause the curtains to blow open and expose the interior of the screened space.

It is an object of my invention to provide an improved screen system in which the space or cubicle to be screened is substantially completely enclosed, and this with a minimum number of separate curtains.

It is another object to provide a screen system which will be easy to operate, will function properly and, when not in use, may be compactly arranged so as to be out of the way.

It is a further object to provide a screen system which will be sanitary in use and one in which the curtains may be easily removed for laundering, and easily rehung.

It is still another object to provide improved details of construction to not only facilitate installation of the screen system, but which will provide for proper rigidity and facilitate operation.

Other objects and advantages will be hereinafter pointed out or will become apparent upon a reading of the specification.

Briefly stated, in a preferred form of the invention, I provide a screen system suspended above the space to be screened, such as a cubicle for a hospital bed. The curtain or curtains are suspended from a suspended trackwork and are preferably of such length as to clear the floor. The trackwork is preferably made up of certain novel parts, which may be standardized for meeting various structural situations. The track is so arranged that a single curtain may screen three sides of a space up against a wall, so that there need be no gaps between curtains, and thus privacy is assured. The trackwork preferably includes one or more short arcuate sections of ample radius, arranged to be operatively connected to straight or other curved track sections, so as to provide a track of the desired form.

The trackwork is suspended, in part at least, from the ceiling and preferably also from a wall. The means for suspending the trackwork from the ceiling is so arranged as to permit curtain hooks traveling on the trackwork to pass such points of suspension freely so that a single curtain may, if desired, serve to completely enclose three sides of a cubicle defined on the fourth side by a wall.

Where several adjacent spaces are to be screened, the trackwork is preferably so arranged that a single curtain forming part of one cubicle screen serves to screen two sides of the cubicle wall, a curtain forming part of a screen for the adjacent cubicle screening the third side of the first cubicle. Thus, a minimum amount of curtain material is required where there are adjacent cubicles to be screened.

In the drawings which show, for illustrative purposes only, preferred forms of the invention—

Fig. 3 is a view in elevation of a satisfactory type of hook for use as part of my screen system and illustrating the same on a track shown in section;

Fig. 4 is a view of the parts shown in Fig. 3, but seen at right angles thereto;

Fig. 5 is a plan view in detail of an arcuate or curved track section, together with a straight track section and common suspension means for the two track sections;

Fig. 6 is a view in side elevation of the parts shown in Fig. 5.

Fig. 7 is a view somewhat similar to Fig. 5, but illustrating a modification of the straight track section and illustrating a different suspension device;

Fig. 8 is an isometric view of a detail of the suspension device of Fig. 7;

Fig. 9 is a view similar to Fig. 5, but illustrating a different track arrangement and slightly different suspension detail;

Fig. 10 is an isometric view of the suspension fitting shown in Fig. 9;

Fig. 11 is an isometric view of an adapter collar used in connection with the suspension bracket of Fig. 12;

Fig. 12 is a side view in partial section of a suspension bracket for a track;

Fig. 13 is a fragmentary plan view of a track illustrating its attachment to the wall at a point out of line with the main track;

Fig. 14 is an isometric view of a different form of wall bracket;

Fig. 15 is a side view in partial section of a wall or ceiling bracket attached to a ceiling and illustrating a suspension tube attached thereto.

Figure 1:
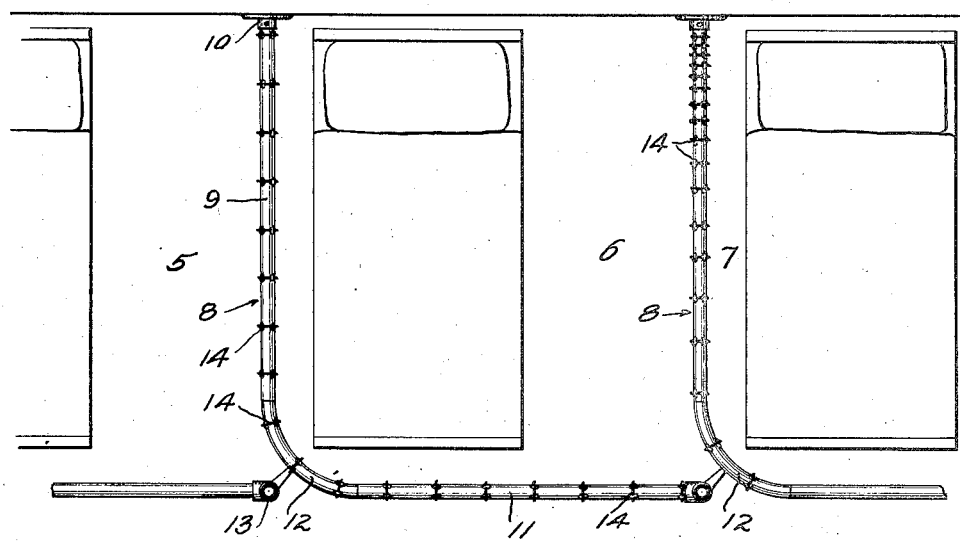
Fig. 1 is an illustrative plan view illustrating a screen system for a plurality of adjacent cubicles.

In said drawings, 5—6—7 indicate three of a plurality of adjacent spaces or cubicles to be screened. As illustrated, these spaces are each occupied by a bed, for example, hospital ward beds. Where a plurality of adjacent spaces are to be screened I prefer to employ a plurality of generally L-shaped tracks 8—8. The back 9 of each L-track is preferably secured to the wall by a wall or ceiling bracket 10, and the free end of the base 11 of each L-track preferably terminates adjacent the arcuate or curved angle 12 of the next adjacent L-track. As illustrated, each free end of the base 11 and the curved or arcuate track section 12 of the next adjacent L are suspended by a common suspension tube or rod 13 by means to be more specifically described hereinafter. Suffice it to say at this point that a suspension means is so arranged as to permit the free passage of curtain hooks 14—14 carrying a curtain 15.

The curtain 15 is of a length to extend from the wall along the leg 9 of the track around the arcuate section 12 and along the base 11 up to a point adjacent the curved section 12 of the next adjacent track. The curtain 16 on the next adjacent track is preferably of the same length as the curtain 15, but for enclosing the cubicle 6 the curtain 15 is employed for enclosing two sides defined by track sections 9—11 of the cubicle, while the curtain 16 of the next adjacent track is drawn outwardly from the wall so as to enclose the third side. In the form illustrated in Figs. 1 and 2, there may be a slight gap between the curtains 15 and 16, but by means to be hereinafter described such gap may be either closed or so arranged as to maintain the privacy of the screened space. Curtains, when not in use, may be readily slid back on each track and be positioned against the wall. All of the curtains are preferably of such length as to clear the floor so as to avoid the collection of dust and germs.

The specific hook shown in Figs. 3 and 4 is illustrated merely as a hook adaptable to my screen system. The details of that hook are not of my invention, but are described and claimed in the patent of Robert D. W. Vroom, No. 1,857,293, May 10, 1932. Other suitable hooks may be employed in my system. Each hook of the particular form illustrated includes a bent wire hook part 17, carrying rollers 18—18 which may be of felt to secure relatively silent operation. The space between the end 19 of the hook and the opposite side 20 is preferably such that the hook cannot accidentally become disengaged from any part of the track 8 but, due to the spring of the wire, may be passed over the track 8 without taking the latter down from the wall. The curtain is suspended from the open eye 21 forming a part of the hook, which open eye is preferably so arranged that even though the curtain be jerked so as to cause the hook to rotate either partially or wholly around the track 8, the grommet of the curtain is not likely to become disengaged from the bent eye 21, and yet the grommet of the curtain may be readily passed over the end of the eye 21 when it is desired to hang the curtain, and the grommet may be readily removed when it is desired to take down the curtain for laundering or other purposes.

Figure 2:
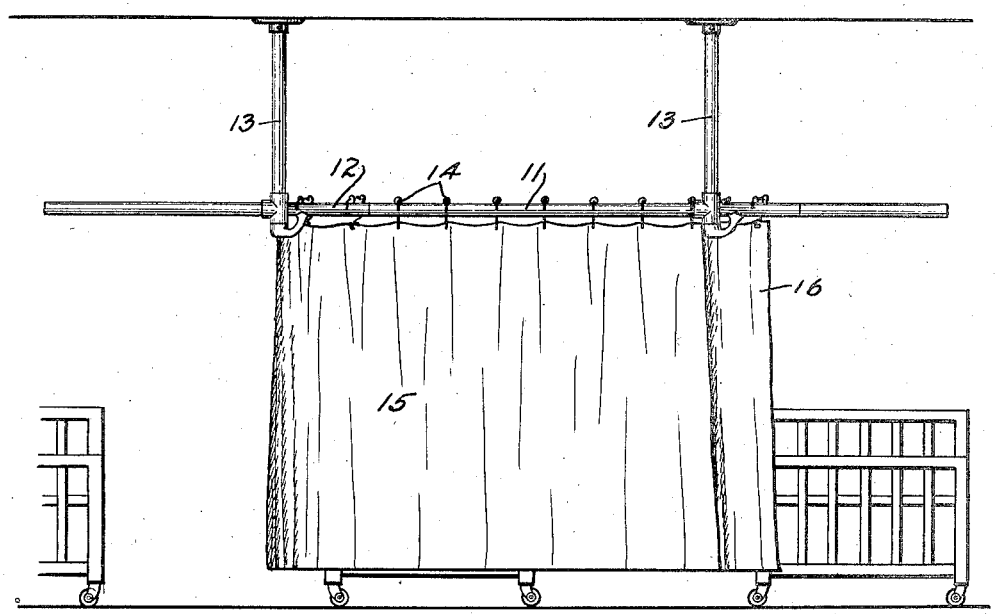
Fig. 2 is a view in side elevation of the system shown in Fig. 1.

In the enlarged details of Figs. 5 and 6 which illustrate the mode of suspension of the tracks illustrated in Figs. 1 and 2 there is an arcuate tube section 12 which is of substantial radius, the ends extending in lines at substantially right angles to each other, so as to form preferably tangential continuations of the straight track sections 9—11. Each track is preferably formed of hollow tubing, which may thus be rather light in weight and yet possess all the strength requisite for the use to which it is put. In my improved system I prefer to standardize, so far as possible, the various track sections and suspension means. The arcuate sections 12 may be of standard length and radius or sweep, so as to permit free passage of the curtain hooks, and though the straight track sections may not always be standard in length, it is a simple matter to cut the straight section tubing to the required length.

Each curved section 12 preferably has an adapter sleeve 22 secured at each end and projecting beyond the end, so as to receive and support the adjacent end of a straight track section 9 or 11. If desired, the sections 9—11 may be secured to the adapter or connector sleeves 22 by any suitable means, such as a screw.

As heretofore stated, when a series of generally L-shaped tracks are employed, the end 23 of one L-track 8 (Figs. 5 and 6) is supported adjacent to the curved or arcuate section 12 of the next adjacent track. Both track sections are preferably supported as heretofore indicated by a suspension rod or tube 13. Such mode of suspension and connection preferably includes a suspension bracket, designated generally 24 and shown in detail in Fig. 12. Such bracket may include a base or body part 25 having a generally laterally and upwardly extending arm 26. The upper end of the arm 26 is provided with a rather small supporting head 27, preferably conforming substantially to the surface of the track 8. Suitable means, such as a screw 28, serve to secure the track 8 to the arm 26.

The bracket 24 is suspended at a point removed laterally from the curved section 12 by means of the suspending tube or rod 13 and, when arranged as illustrated in Figs. 5 and 6, by a T-fitting 29. The suspension bracket 24 is arranged to coact with the fitting 29, and in the form shown the base 25 of the suspension bracket is provided with an upstanding lug or sleeve 30, which may have holes 31—31 extending at substantially right angles to each other for the passage of screws. The holes are arranged at substantially right angles to each other to permit the suspension bracket 24 to be arranged in one of four positions at 90° to each other. The upstanding lug or sleeve 30 fits within the lower opening in the T-fitting 29, and means, such as a screw 32, secure the suspension bracket 24 in the T-fitting 29. The T-fitting, if desired, may be split as indicated at 33 and the screw 32 is threaded into one of the apertures in the fitting 29, so that when the screw is drawn up the T-fitting springs sufficiently to grip the suspension bracket and hold the same rigidly. The suspension tube or rod 13 in a similar manner fits in the upper opening of the T-fitting 29 and may be secured therein by means of a screw 34, after the manner just described. The side outlet of the T-fitting 29 receives the end 23 of the next adjacent track, which is preferably secured therein in the same manner that the suspension bracket 24 and suspension tube 13 are secured.

The tube 13 may be suspended from the ceiling by means of a ceiling or wall bracket 10, shown more in detail in Fig. 15. Such a ceiling or wall bracket may comprise a substantially disk-like base 35, to fit flat against the wall or ceiling and inwardly from the edge. Such base 35 is preferably relieved, as indicated at 36, so that there is left a relatively narrow engaging flange for the wall. The disk base 35 is provided with a sleeve 37 extending therefrom, which sleeve is preferably split, as indicated at 38. The base 35 in the preferred form has a hole centrally thereof for the passage of a wood screw 39. By having the securing screw 39 centrally of the base and having the base engaging the wall or ceiling around its periphery only, it has been found that the plaster or other finish on the wall is not cracked or marred by the installation of such a bracket; that is to say, the securing screw 39 being so far removed from the edge, any cracks or marring of the plaster by such screw will not extend out as far as the edge, and any marring will be concealed by the base 35. The suspension tube 13 is held in the sleeve 37 as by means of a screw 40, which passes through the tube 13 of the sleeve. If the sleeve is split the screw is threaded into one side of the sleeve, so as to draw the two sides together and rigidly clamp the tube 13, so that the latter is held in the sleeve not only by the screw 40 but by the friction between the tube and sleeve.

When the tracks are arranged as illustrated in Figs. 1 and 2, the wall bracket 10 illustrated in detail in Fig. 15 may be employed for securing the track sections to the wall, as will be understood.

When it is desired to suspend two separate track sections which do not terminate at the suspension means, for example, as shown in Fig. 7, I may provide a slightly different arrangement. As shown in Fig. 7, the track sections 9—11—12 are the same as those shown in Fig. 5. The end of the next adjacent track, however, terminates not in a straight tubing, as indicated at 23 in Fig. 5, but terminates in an arcuate or curved track section 45 which, in the form shown, has a stop button 46 at the end. Thus the end of a curtain supported from section 45 will overspan or extend up to an intermediate portion of that part of the curtain suspended from sections 9—12 and block vision into the cubicle guarded by the first mentioned curtain. With such an arrangement I employ a suspension bracket 24 for each of the arcuate sections 12—45, and the lugs 30 on each suspension bracket (Fig. 12) are received in the legs 46—46 of a Y-fitting illustrated more particularly in Fig. 8. These legs on the Y-fitting are preferably split, as indicated at 47, and the screws passing through the holes 31 of the suspension bracket serve to contract the hollow legs of the Y, so as to rigidly clamp and hold the suspension brackets 24 in place. The central outlet 48 of the Y-fitting receives a suspension member 13, which is held by means of a screw 49, as heretofore described. The outlet 48 may likewise be split, so as to cause the tube 13 to be tightly clamped therein.

It will be noted that with the end of the straight track section 11 terminating adjacent to the curved section 12 of the next adjacent track, as illustrated in Figs. 1, 2, 5 and 6, there may be a slight gap between the curtains 15 and 16. With the arrangement of tracks shown in Fig. 7, the curved section 45 runs along substantially parallel to the straight track section 9 of the adjacent track, and little or no gap is left, and what gap there is runs along at substantially right angles to the wall and it will be difficult or impossible for a person to see through the gap in any direction except substantially perpendicular to the wall. Privacy of the screened space is thus assured.

It will be clear that if a straight track section (not shown) be secured to the curved section 45 in place of the stop button 46 and such straight track section be secured to the wall, a single curtain may be employed for enclosing three sides of the cubicle, the fourth side being closed by the wall. However, as heretofore stated, when there are a plurality of adjacent cubicles to be screened, curtain material is saved by using a single curtain to enclose two sides and a curtain on the next adjacent track to close the third side of a cubicle. However, where a single cubicle is to be enclosed by the means described, involving the addition of a straight track section in place of the stop button 46, a single curtain may completely enclose the cubicle.

In the track arrangement shown in Fig. 9, the track sections 9—11—12 of the suspension bracket 24 may be the same as those heretofore described. Fig. 9 shows the possibility of different curtain arrangements for enclosing other spaces which are not side by side, as those shown in Fig. 1, but may be end to end. Fig. 9 shows also an arrangement for screening a hallway or passage between a series of adjacent cubicles on opposite sides of the ward. With the arrangement shown I employ what may be termed generally a T-fitting 50, having duplicate outlets 51—51 instead of a single outlet, as in Figs. 5 and 6. A straight track section 52 is received in one outlet 51, while an arcuate track section 53 is received in the other track section. The suspension bracket 24 and the suspension tube 13 may be the same and may be secured the same as heretofore described. All of the receiving parts of the fitting 50 may be split so that the tubes are clamped and held as heretofore described. The arcuate section 53, instead of joining a straight track section, may join a second arcuate section 54, which in turn may join another arcuate section or a straight section 55, which sections may be secured together as heretofore described in connection with Fig. 5.

When only a single section, whether it be curved or straight, is to be suspended by a suspension bracket 24, as illustrated at the left of Fig. 9, I preferably employ an adapter sleeve or collar 56, shown in detail in Fig. 11. Such collar is preferably split and is provided with spaced apart holes 57—57. Such collar is adapted to fit over and be secured, as heretofore described, to the upstanding lug or sleeve 30 upon the suspension bracket (Fig. 12), and is adapted to receive and be secured to the suspension tube 13 by means of a screw 58, as heretofore described.

It will thus be seen that various track arrangements may be formed with relatively few parts of more or less standard construction.

Sometimes the particular arrangement shown in Figs. 1 and 2 is not feasible because there are windows which continuations of the straight track sections 9 would intersect. While in that case the entire track might be suspended from the ceiling, I prefer to always have a track at some point secured to a wall in order to secure adequate support. When a window interferes with a straight track section 9 I preferably employ the arrangement illustrated in Fig. 13, wherein I attach to the inner end of a shorter track section 9 an arcuate track section 60 and, if necessary, a straight track section 61, which may be secured in a wall bracket 62 of any desired form. With the arrangement illustrated in Fig. 13 the bracket 62 would be secured at the right-hand side of a window, which would then be at the left of the bracket 62. Thus, adequate wall support would be secured, and yet the curtain may be slid back along the sections 9—60—61 so as to be up against the wall and out of the way of the window when not in use.

The bracket shown in Fig. 14 is merely another form of wall bracket which could be used in place of the bracket 62 and for the same purposes. The bracket shown in Fig. 14, due to the rather elongated tube receiving socket 63, gives rather more support to the pipe section 61 than does the bracket 62.

I have herein illustrated various track arrangements for meeting varying conditions. It is, however, to be understood that various other track arrangements may be made to meet still other conditions, and by showing various modifications I have by no means exhausted the arrangements which could be made and may even be called for.

All of the parts of my track system are preferably formed of nickle or chrome plated metal, to prevent deterioration and to provide for a free movement of the curtain hooks along the tracks. The curtains in the preferred form terminate short of the ceiling and also above the floor, so that adequate ventilation is always possible and so that the curtains will not collect dust and germs. My curtain system is admirably adapted for hospital use, where it has met with considerable success, but there are other situations where it will be found useful.

While the invention has been described in considerable detail and various modifications and arrangements shown, it is to be understood that various changes, additions, modifications and omissions may be made within the scope of the invention as defined in the appended claims.

I claim:

1. In a screen system, a tubular track having an arc shaped fitting therein, another tubular track terminating adjacent said fitting, a support suspended from the ceiling, means connecting said support to said arc shaped fitting and to said track terminating adjacent thereto, to provide tracks for a plurality of curtain hooks.

2. In a screen system for screening adjacent spaces comprising a pair of tracks suspended in part at least from the ceiling, one of said tracks comprising a substantially L-shaped section, one of said tracks terminating in a short arc shaped portion at one end slightly spaced from but extending along a part of the adjacent track, for the purpose described.

3. In a screen system, two separate but adjacent tracks, each for independently supporting a curtain, means for suspending said tracks from a ceiling comprising a suspension bracket secured to each of said tracks, each said suspension bracket comprising a fitting secured to the under-side of its track extending laterally and upwardly therefrom, and a fitting on the laterally extending portion of said bracket for receiving a vertically extending suspension member.

4. In a screen system, a pair of tracks, one terminating adjacent an intermediate part of the other and slightly spaced therefrom, means for suspending said tracks from the ceiling comprising a suspension bracket secured to the underside of said intermediate portion of said track and extending downwardly and outwardly thereof and having a vertically extending part, a fitting for inter-engagement with said vertically extending part, said fitting having a lateral outlet for interfitting engagement with the terminal end of said adjacent track, said fitting having a vertically extending portion for interfitting engagement with a suspension member secured to the ceiling.

5. In a screen system, a track, and means for supporting said track including a wall or ceiling bracket comprising a flat plate to fit a wall or ceiling, said bracket having a part inwardly of the margin thereof relieved, said bracket having an opening therethrough at the relieved portion for receiving a securing device to pass through said bracket and into a wall or ceiling, said bracket having a cup-like attachment member, said opening being within said cup-like member.

6. In a screen system, a track, and means for supporting said track including a wall or ceiling bracket comprising a disk-like base member to fit a wall and having an open cup extending from one side thereof, the side of said disk-like base member being relieved inwardly of the periphery thereof at the side to engage the wall, said disk-like member having an aperture therethrough and within the cup-like member for receiving a securing device to pass therethrough and be secured in the wall, said cup-like portion being split to render the same slightly resilient, and a securing member for drawing the sides of said cup-like member together, for the purpose described.

7. In a screen system, a track, means for supporting the same and comprising a fitting having a sleeve-like opening therein to receive the track, said sleeve-like opening being split to render the same slightly resilient, and a screw for securing a track member in said sleeve-like receiving portion and drawing the parts of said sleeve-like receiving portion together to form a tight fit with said track member.

8. In a screen system, a suspension bracket, including a body member having a reduced upstanding lug with apertures therethrough at substantially right angles to each other, said body having a laterally and upwardly extending arm, the end of said arm being shaped to conform substantially to the shape of a track to be supported thereby, said arm having an aperture therein for receiving a screw for securing a track member thereto, said upstanding lug being adapted to interfit with a part of a supporting member suspended from the ceiling.

9. In a screen system, a pair of generally L-shaped tracks spaced from each other, the end of the base of one L being adjacent the angle of the next adjacent L, said L-shaped tracks being substantially arcuate at the angles thereof, means for suspending said tracks from above, the end of the base of one L being curved in substantial parallelism with the leg of the adjacent L, whereby the end of one curtain suspended on one track may extend along a part of the adjacent curtain on the other track and lie in substantial parallelism therewith.

10. In a screen system, a plurality of tracks for suspending curtains to enclose adjacent spaces, two of said tracks having closely adjacent portions thereof extending along each other in substantial parallelism, whereby curtains suspended on said tracks may lie closely adjacent each other and in substantial parallelism, and means for suspending said tracks from overhead.

11. In a screen system, a plurality of separate tracks for suspending separate curtains to enclose adjoining spaces, one of said tracks having an end portion extending along a portion of the adjacent track, whereby curtains suspended on said tracks will extend along each other in substantial parallelism, and a common means for suspending both of said tracks from a ceiling.

12. In a screen system, a plurality of tracks for suspending curtains to enclose spaces, one of said tracks having a terminal end closely adjacent an intermediate portion of an adjacent track, a fitting engaging said terminal end for supporting the same and having a bracket arm extending therefrom and engaging the adjacent track for supporting the same, and a common means for suspending said fitting and two adjacent tracks from a ceiling.

13. In a screen system, a track, means for supporting the same comprising a fitting having a sleeve-like receiving portion, said sleeve-like receiving portion being split to render the same slightly resilient, a suspension member in said sleeve-like receiving portion, and means for drawing the parts of said sleeve-like receiving portion together to form a tight fit with said suspension member, and means for supporting said track from said fitting.

14. In a screen system, a track member for supporting a curtain to enclose a space, means for supporting said track at least in part from a ceiling comprising a member secured to and dependent from the ceiling, a fitting to be secured to at least one of said members, said fitting and said member secured thereto having interfitting parts and means for causing a radial clamping action between said fitting and member to securely hold said parts.

15. In a screen system, a plurality of tracks for suspending curtains to enclose spaces, one of said tracks having a curved portion and another track having a portion adjacent said curved portion and extending along in generally parallel relation therewith for the purpose described.

16. In a screen system, a pair of adjacent but separate tracks for separate curtains, and means for suspending said tracks comprising a suspension bracket for each of said tracks, each said suspension bracket comprising a fitting secured to the underside of at least one of said tracks and extending laterally thereof, and a common suspension means for supporting said bracket and said tracks from overhead.

17. In a screen system, a track, means for suspending said track from the ceiling, comprising a suspension bracket having a part extending under and interfitting with an under-part of the track and leaving the upper part unobstructed, a securing member passing downwardly through the track and secured to said underlying suspension bracket, and suspension means connected to said bracket out of the track line for suspending said bracket and track from overhead.

18. In a screen system, track means, and means for supporting the same including a fitting having a sleeve-like receiving portion, said sleeve-like receiving portion being split to render the same resilient, and means for contracting said sleeve-like receiving portion for the purpose described.

COURTENAY P. DAY.